US010252651B2

(12) United States Patent
Bhatia et al.

(10) Patent No.: US 10,252,651 B2
(45) Date of Patent: Apr. 9, 2019

(54) SEAT ASSEMBLIES HAVING SEAT HEATER WIRE HARNESSES CONNECTED TO CHILD RESTRAINT BRACKETS FOR VEHICLES

(71) Applicant: Toyota Motor Engineering & Manufacturing North America, Inc., Erlanger, KY (US)

(72) Inventors: Vikas Bhatia, South Lyon, MI (US); Robert J. Stauffer, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 68 days.

(21) Appl. No.: 15/676,390

(22) Filed: Aug. 14, 2017

(65) Prior Publication Data
US 2019/0047450 A1 Feb. 14, 2019

(51) Int. Cl.
| A47C 7/62 | (2006.01) |
| B60N 2/56 | (2006.01) |
| B60N 2/30 | (2006.01) |
| B60N 2/20 | (2006.01) |
| B60N 2/28 | (2006.01) |

(52) U.S. Cl.
CPC ............. B60N 2/5678 (2013.01); B60N 2/20 (2013.01); B60N 2/2887 (2013.01); B60N 2/3011 (2013.01)

(58) Field of Classification Search
CPC ...... B60N 2/68; B60N 2/5657; B60N 2/5642; B60N 2/2806; B60N 2/2875; B60N 2/3011
See application file for complete search history.

(56) References Cited

U.S. PATENT DOCUMENTS

| 6,429,544 | B1 | 8/2002 | Sasaki et al. | |
| 6,903,286 | B2 | 6/2005 | Kaijala et al. | |
| 7,131,693 | B2 | 11/2006 | Smallwood et al. | |
| 7,306,283 | B2 * | 12/2007 | Howick | B60N 2/5678 297/180.12 |
| 9,039,081 | B2 * | 5/2015 | Arefi | B60N 2/686 297/188.12 |
| 9,272,650 | B2 | 3/2016 | Saitou et al. | |
| 9,878,680 | B2 * | 1/2018 | Mita | B60R 16/0215 |
| 9,931,999 | B2 * | 4/2018 | Line | B60N 2/6009 |
| 10,029,594 | B2 * | 7/2018 | Line | B60N 2/7094 |
| 2002/0050730 | A1 * | 5/2002 | Kondo | B60N 2/002 297/217.3 |

(Continued)

FOREIGN PATENT DOCUMENTS

| EP | 1731373 A1 | 12/2006 |
| JP | 2013-126796 A | 6/2013 |
| JP | 6052067 B2 | 12/2016 |

*Primary Examiner* — Shin H Kim
(74) *Attorney, Agent, or Firm* — Dinsmore & Shohl LLP

(57) ABSTRACT

A seat assembly includes a seatback, a seatback heater, a child restraint bracket, and a wire harness. The seatback is moveable between a seated position and a folded position. The seatback heater is connected to the seatback. The child restraint bracket includes a pair of isofix anchors. The wire harness includes a first end and an opposite second end. The first end is connected to the child restraint bracket. The second end is connected to the seatback heater. The wire harness accommodates movement of the seatback between the seated position and the folded position.

20 Claims, 6 Drawing Sheets

(56) References Cited

U.S. PATENT DOCUMENTS

| | | | | |
|---|---|---|---|---|
| 2004/0100131 | A1* | 5/2004 | Howick | B60N 2/5678 |
| | | | | 297/180.12 |
| 2004/0245811 | A1* | 12/2004 | Bevan | A47C 7/425 |
| | | | | 297/180.12 |
| 2005/0168024 | A1* | 8/2005 | Duffy | B60N 2/286 |
| | | | | 297/253 |
| 2007/0114826 | A1* | 5/2007 | Austin | B60N 2/289 |
| | | | | 297/253 |
| 2008/0296942 | A1* | 12/2008 | Schweiker | B60N 2/5685 |
| | | | | 297/217.3 |
| 2010/0219674 | A1* | 9/2010 | Sakkinen | B60N 2/0722 |
| | | | | 297/452.18 |
| 2011/0109133 | A1* | 5/2011 | Galbreath | A47C 7/748 |
| | | | | 297/217.3 |
| 2011/0285189 | A1* | 11/2011 | Petzel | B60N 2/56 |
| | | | | 297/284.1 |
| 2013/0119720 | A1* | 5/2013 | Dixon | B60N 2/686 |
| | | | | 297/216.1 |
| 2013/0119741 | A1* | 5/2013 | Medoro | B60N 2/686 |
| | | | | 297/452.18 |
| 2013/0193734 | A1* | 8/2013 | Pleskot | B60N 2/12 |
| | | | | 297/354.1 |

* cited by examiner

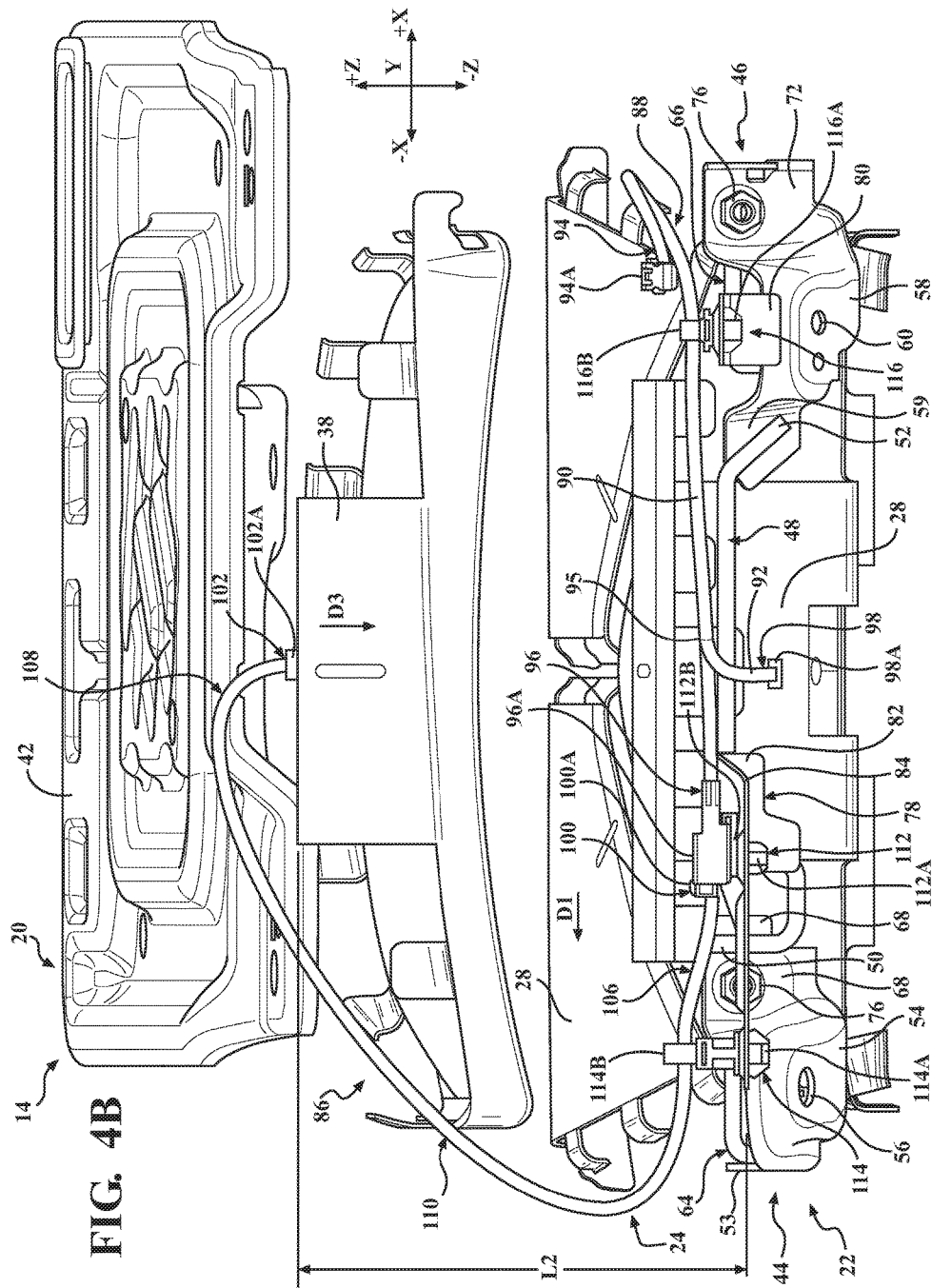

SEAT ASSEMBLIES HAVING SEAT HEATER WIRE HARNESSES CONNECTED TO CHILD RESTRAINT BRACKETS FOR VEHICLES

TECHNICAL FIELD

The present specification generally relates to seat assemblies for vehicles and, more specifically, to seat assemblies having seat heater wire harnesses connected to child restraint brackets for vehicles.

BACKGROUND

Vehicles may be equipped with a seat cushion heater and a seatback heater that heats a seat cushion and seatback, respectively, of rear seat assemblies. The seat cushion heater and the seatback heater are connected to a vehicle power supply via a wire harness. The wire harness is typically incorporated into a floor of the vehicle or provided underneath the rear seat assembly as the seat cushion and the seatback of the rear seat assembly are fixedly secured to the floor of the vehicle. Increasingly, vehicles are provided with rear seat assembly having a seatback that is moveable between a seated position and a folded position.

Accordingly, there is a need for a seat assemblies capable of accommodating the movement of seatbacks between a seated position and folded positions while maintaining a connection of a seatback heater to a power source of the vehicle.

SUMMARY

In accordance with one embodiment, a seat assembly for a vehicle having a floor is provided. The seat assembly includes a seatback, a seatback heater, a child restraint bracket, and a wire harness. The seatback is moveable between a seated position and a folded position. The seatback heater is connected to the seatback. The child restrain bracket includes a pair of isofix anchors. The wire harness includes a first end and an opposite second end. The first end is connected to the child restraint bracket. The second end is connected to the seatback heater. The wire harness accommodates movement of the seatback between the seated position and the folded position.

In accordance with another embodiment, a vehicle is provided. The vehicle includes a floor, a seatback, a seatback heater, a child restraint bracket, and a wire harness. The seatback is moveable between a seated position and a folded position. The seatback heater is connected to the seatback. The child restrain bracket includes a pair of isofix anchors. The wire harness includes a first end and an opposite second end. The first end is connected to the child restraint bracket. The second end is connected to the seatback heater. The wire harness accommodates movement of the seatback between the seated position and the folded position.

In accordance with another embodiment, a method of assembling a seat assembly is provided. The method includes providing a providing a seatback, a seatback heater, and a child restraint bracket. The seatback is moveable between a seated position and a folded position. The seatback heater is connected to the seatback. The child restraint bracket includes a pair of isofix anchors. The child restraint bracket is mounted to the floor of the vehicle. The method also includes connecting a first end of a wire harness to the child restraint bracket and connecting an opposite second end to the seatback heater such that the wire harness accommodates movement of the seatback between the seated position and the folded position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

FIG. 4B schematically depicts a rear view of the seat assembly of FIG. 2 with the seatback in a folded position, according to one or more embodiments described and illustrated herein.

DETAILED DESCRIPTION

Figure 1:
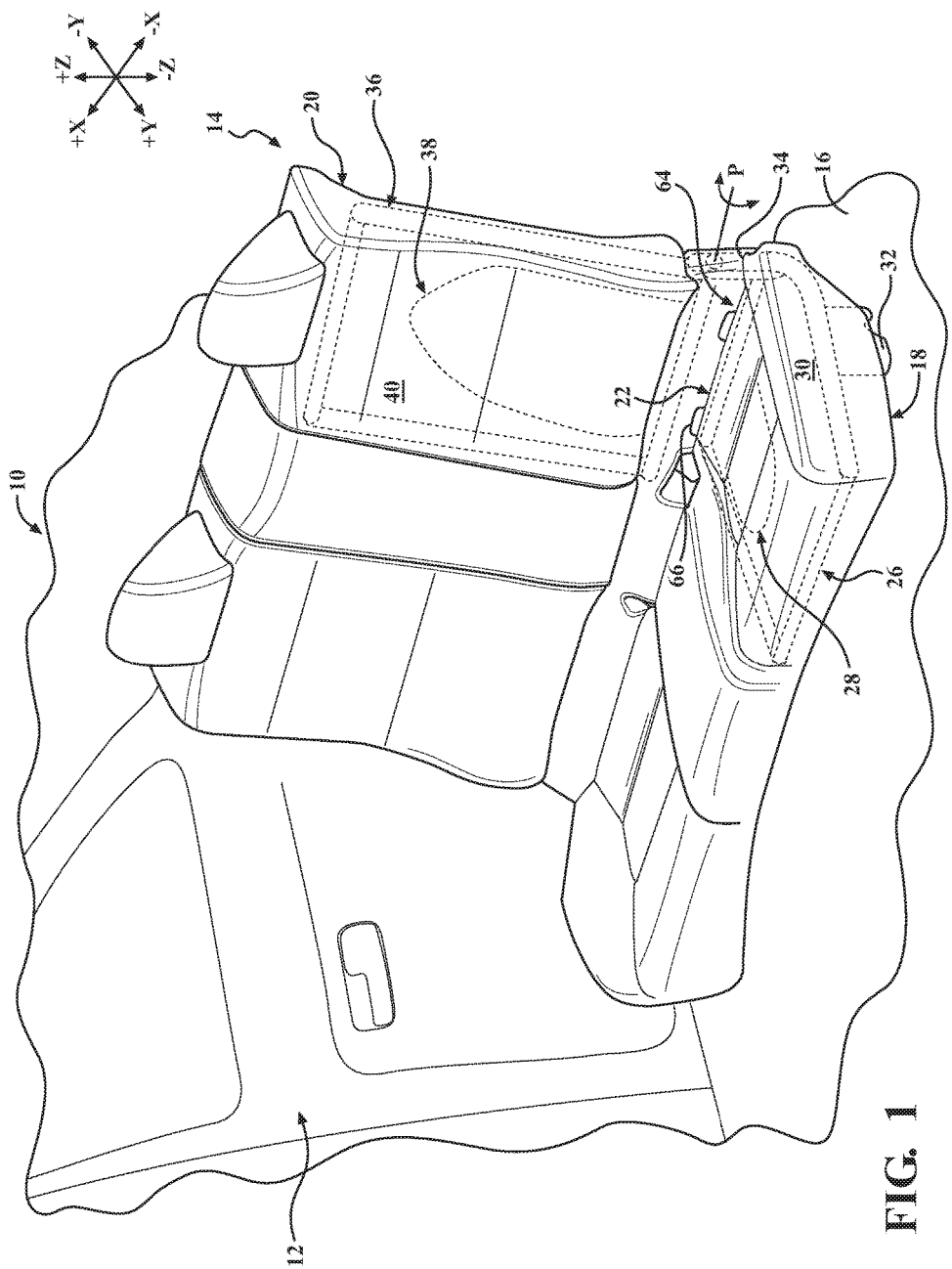
FIG. 1 schematically depicts a partial perspective view of a passenger compartment of a vehicle having a seat assembly having a seatback heater connected to a seatback moveable between a seated position and a folded position, according to one or more embodiments described and illustrated herein.

Vehicles according to the present specification include a passenger compartment having a driver seat and a front passenger seat. Positioned rearward of the driver seat and the front passenger seat is a rear seat assembly. In some embodiments, the rear seat assembly may be provided as a rearward most portion of the passenger compartment and provided forward of a trunk area. In some other embodiments, the rear seat assembly may be provided as a second row seat assembly or a third row seat assembly.

The rear seat assembly includes a seatback, a seatback heater, a child restraint bracket, and a wire harness. The seatback is moveable between a seated position and a folded position. The seatback heater is connected to the seatback. The child restrain bracket includes a pair of isofix anchors. The wire harness includes a first end and an opposite second end. The first end is connected to the child restraint bracket. The second end is connected to the seatback heater. The wire harness accommodates movement of the seatback between the seated position and the folded position.

The embodiments disclosed herein may be configured to allow for a seat assembly to include a seatback heater in a seatback that is moveable between a seated position and a folded position. Specifically, the first end of the wire harness is connected to the child restraint bracket and the second end is connected to the seatback heater such that the wire harness accommodates movement of the seatback between the seated position and the folded position. The wire harness is provided with a length that accommodates the movement of the seatback between the seated position and the folded position.

In some embodiments, the wire harness may include a first portion adjacent the first end, a second portion adjacent the second end, and an intermediate portion between the first portion and the second portion. The first portion may extend in a first direction. The intermediate portion bends such that the second portion extends in a second direction different from the first direction.

As the intermediate portion of the wire harness may be bent and/or curved such that the first portion extends in a first direction and the second portion extends in the second direction different than the first direction, the intermediate portion of the wire harness has a generally curved or arcuate shape. The generally arcuate shape of the intermediate portion allows the wire harness to accommodate movement of the seatback between the seated position and the folded position. Specifically, in the seated position, a seatback heater end is positioned closer to the child restraint bracket than in the folded position. As such, the movement of the seatback from the seated position towards the folded position at least partially straightens the generally arcuate shape of the intermediate portion to provide for the increase in distance due to movement of the seatback between the seated position and the folded position.

In some embodiments, the child restraint bracket includes a first flange and a first connector that connects the first end to the first flange. The child restraint bracket may also include a supplemental connector that connects the first portion to the first flange. The first connector is spaced apart from the supplemental connector in the first direction.

As the first portion is connected to the first flange by the supplemental connector that is spaced apart from the first connector that connects the first end to the first flange, stress on the first end due to the straightening of the intermediate portion is reduced. Specifically, the supplemental connector is positioned between the first end and the intermediate portion such that the first portion of the wire harness between the supplemental connector and the first end. As such, the first portion of the wire harness between the supplemental connector and the first end is not straightened due to the movement of the seatback from the seated position towards the folded position.

In some embodiments, the seat assembly includes a seat cushion, a seat cushion heater and a main wire harness. The seat cushion heater is connected to the seat cushion. The main wire harness includes a main end, a seat cushion end, and a seatback end. The main end connects to a power supply. The seat cushion end connects to the seat cushion heater. The seatback end connects to the first end and connects to the first flange by the first connector.

The child restraint bracket may also include a second flange and a second connector. The second flange is spaced apart from the first flange in a third direction that is opposite the first direction. The second connector connects a portion of the main wire harness between the main end, the seatback end, and the seat cushion end to the second flange.

The connection of the first end and the seatback end to the first flange by the first connector provides a secure connection of the wire harness and the main wire harness to the child restraint bracket. The connection of the seat cushion end to the second flange by the second connector provides a secure connection of the main wire harness to the child restraint bracket.

Various embodiments of the seat assembly for the passenger compartment of the vehicle will be described in more detail herein.

While the embodiments described herein are described in reference to a rear seat assembly of a vehicle, it is appreciated that the seat assembly of the vehicle is not limited to a rear seat assembly of a vehicle. The seat assembly may be provided at any suitable position within the vehicle, such as driver seat, front passenger seat, second row seats, or third row seats. The seat assembly may also be utilized in various types of seats including, but not limited to, bucket or captain seats, bench seats, or split 60/40 bench seats.

It is also appreciated that the seat assembly described herein is not limited to a car. The seat assembly may be provided in a sedan, coupe, SUV, pickup, minivan, wagon, van, or bus. The seat assembly may also be provided in other types of vehicles such as, but not limited to, airplanes, trains or boats.

In some embodiments, the seat assembly is fixedly secured to a floor of the vehicle. However, the embodiments are not limited thereto. For example, in some embodiments, the seat assembly may be releasably attached to the floor of the vehicle to remove the seat assembly from the vehicle.

As used herein, the term "vehicle longitudinal direction" refers to the forward-rearward direction of the vehicle (i.e., in the +/− vehicle Y direction depicted in FIG. 1). The term "vehicle lateral direction" refers to the cross-vehicle direction (i.e., in the +/− vehicle X direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings. Further, the terms "outboard" or "outward" as used herein refers to the relative location of a component with respect to a vehicle centerline. The terms "inboard" or "inward" as used herein refers to the relative location of a component with respect to the vehicle centerline. Because the vehicle structures may be generally symmetrical about the vehicle centerline, the direction to which use of terms "inboard," "inward," "outboard" and "outward" refer may be mirrored about the vehicle centerline when evaluating components positioned along opposite sides of the vehicle.

Referring initially to FIG. 1, a partial perspective view of a passenger compartment 12 of a vehicle 10 is depicted. The passenger compartment 12 includes a front seating area and a rear seating area. The front seating area includes a driver seat and a front passenger seat. The rear seating area is positioned rearward of the front seating area. The rear seating area includes a rear seat assembly 14.

Figure 2:
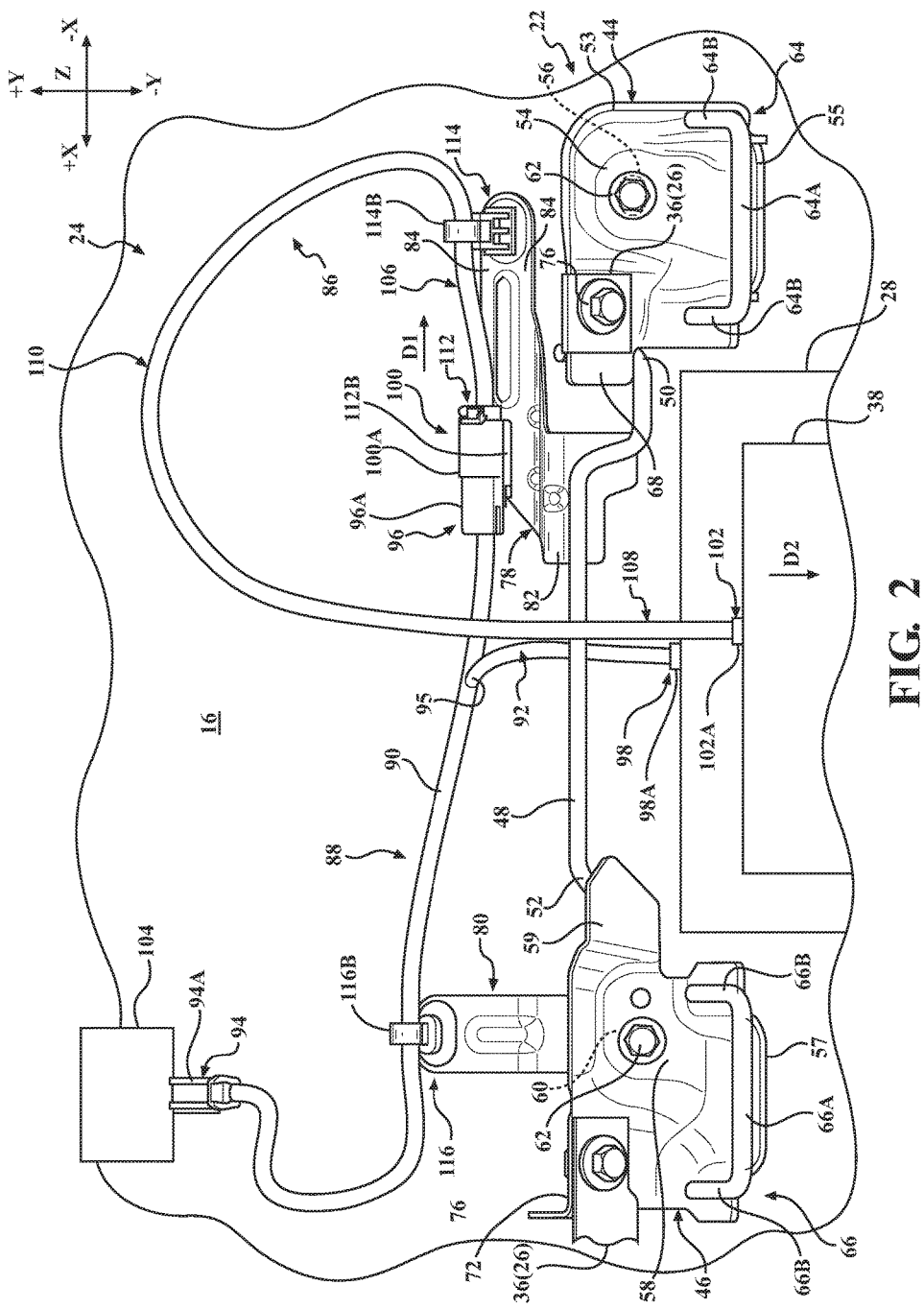
FIG. 2 schematically depicts a top perspective view of a child restraint bracket, FIG. 1 in isolation, according to one or more embodiments described and illustrated herein.

The rear seat assembly 14 is attached to a floor 16 of the vehicle 10. In some embodiments, the floor 16 is a vehicle body component. The rear seat assembly 14 includes a seat cushion 18, a seatback 20, and a child restraint bracket 22. As shown in FIG. 2, the rear seat assembly 14, also includes a seat heater wire harness 24 which will be described in greater detail below.

The seat cushion 18 includes a seat cushion frame 26, a seat cushion heater 28, and an outer seat cushion cover 30. The seat cushion frame 26 supports the seat cushion 18 such that the seat cushion 18 can support an occupant above the floor 16 of the vehicle 10. In some embodiments, the seat cushion 18 includes a foam and/or padding layer that is covered by the outer seat cushion cover 30. The seat cushion heater 28 is provided in the seat cushion 18 to heat a portion of the occupant supported by the seat cushion 18. The seat cushion heater 28 is attached to an underside of the outer seat cushion cover 30. In some embodiment, the seat cushion heater 28 is provided in the seat cushion 18 between the underside of the outer seat cushion cover 30 and the foam and/or padding layer. In some other embodiments, the seat cushion heater 28 is provided in the seat cushion 18 and attached to at least one of the underside of the outer seat cushion cover 30, the foam and/or padding layer, and the seat cushion frame 26.

The seat cushion frame 26 may include a seat cushion arm 32 and an attachment portion 34. The attachment portion 34 secures the seat cushion 18 to the floor 16 of the vehicle 10 to prevent relative movement between the seat cushion 18 and the floor 16. In some embodiments, the attachment portion 34 may be a rail assembly that secures the rear seat assembly 14 to the floor 16 of the vehicle 10 and allows for sliding movement of the rear seat assembly to the floor 16 of the vehicle 10. In some other embodiments, the attachment portion 34 may be a release assembly that releasable secures the rear seat assembly 14 to the floor 16 of the vehicle 10 and which may allow for sliding movement of the rear seat assembly to the floor 16 of the vehicle 10.

The seatback 20 includes a seatback frame 36, a seatback heater 38, and an outer seatback cover 40. The seatback frame 36 supports the seatback 20 such that the seatback 20 can support a back portion of the occupant seated in the rear seat assembly 14. The seatback 20 may also include a seatback substrate 42, as shown in FIGS. 3A-3B and 4A-4B. The seatback substrate 42 provides a rigid surface when the seatback 20 is in the folded position. The seatback substrate 42 may be covered by the outer seatback cover 40.

In some embodiments, the seatback 20 includes a foam and/or padding layer that is covered by the outer seatback cover 40. The seatback heater 38 is provided in the seatback 20 to heat the back portion of the occupant seated in the rear seat assembly 14. The seatback heater 38 is attached to an underside of the outer seatback cover 40. In some embodiment, the seatback heater 38 is provided in the seatback 20 between the underside of the outer seatback cover 40 and the foam and/or padding layer. In some other embodiments, the seatback heater 38 is provided in the seatback 20 and attached to at least one of the underside of the outer seatback cover 40, the foam and/or padding layer, and the seatback frame 36.

In some embodiment, the seat cushion heater 28 and the seatback heater 38 may be formed of a heating element suspended between a substrate, such as a fabric layer. In some other embodiments, the seat cushion heater 28 and the seatback heater 38 may be formed as seat heaters and/or seat coolers in which air is directed through the outer seat cushion cover 30 and the outer seatback cover 40. It is appreciated, of course, that the seat cushion heater 28 may be a device that heats the seat cushion 18, cools the seat cushion 18, or heats and cools the seat cushion 18. Similarly, it is appreciated, of course, that the seatback heater 38 may be a device that heats the seatback 20, cools the seatback 20, or heats and cools the seatback 20.

Figure 3A:
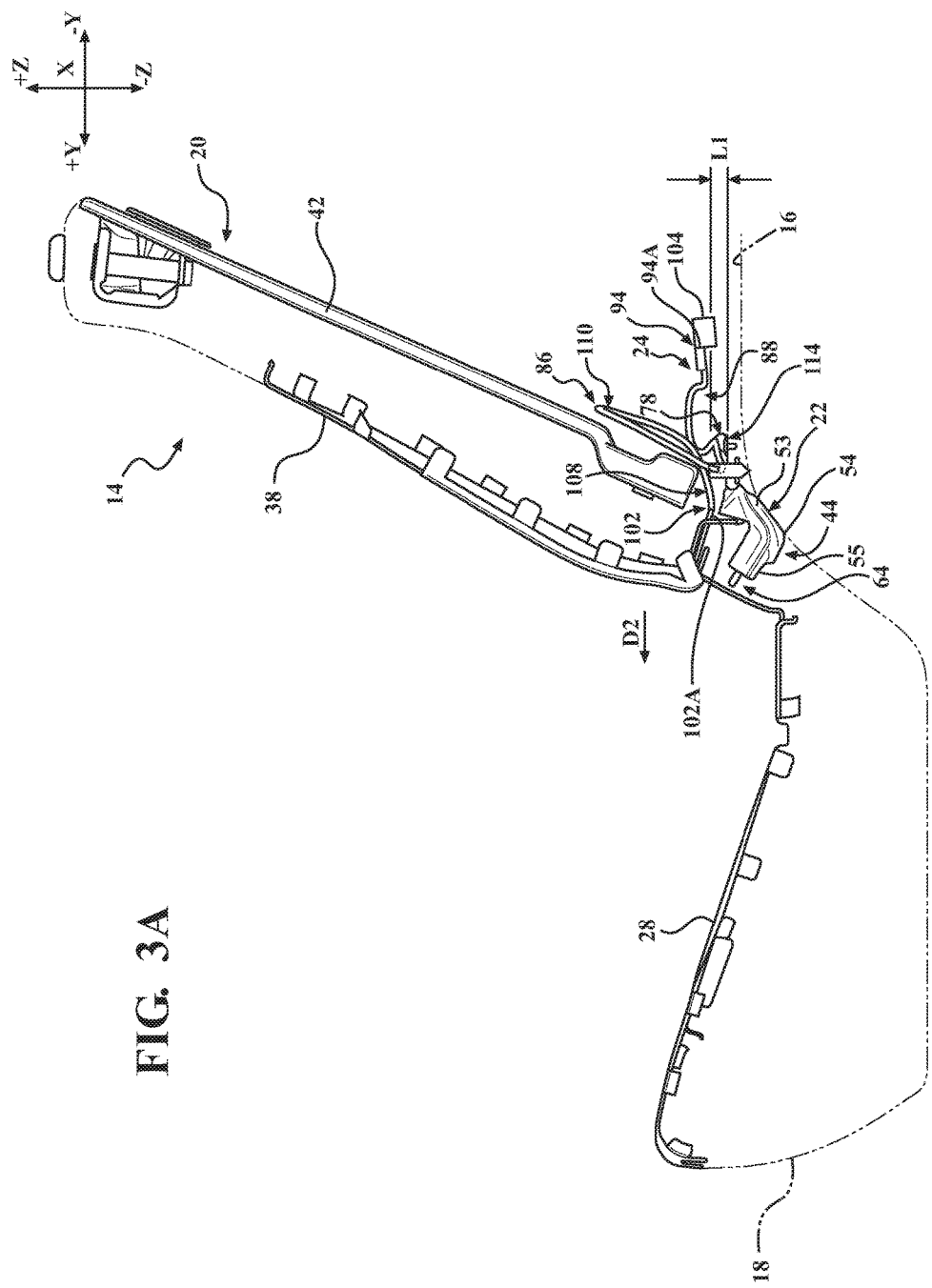
FIG. 3A schematically depicts a side view of the seat assembly of FIG. 2 with the seatback in a seated position, according to one or more embodiments described and illustrated herein.
Figure 3B:
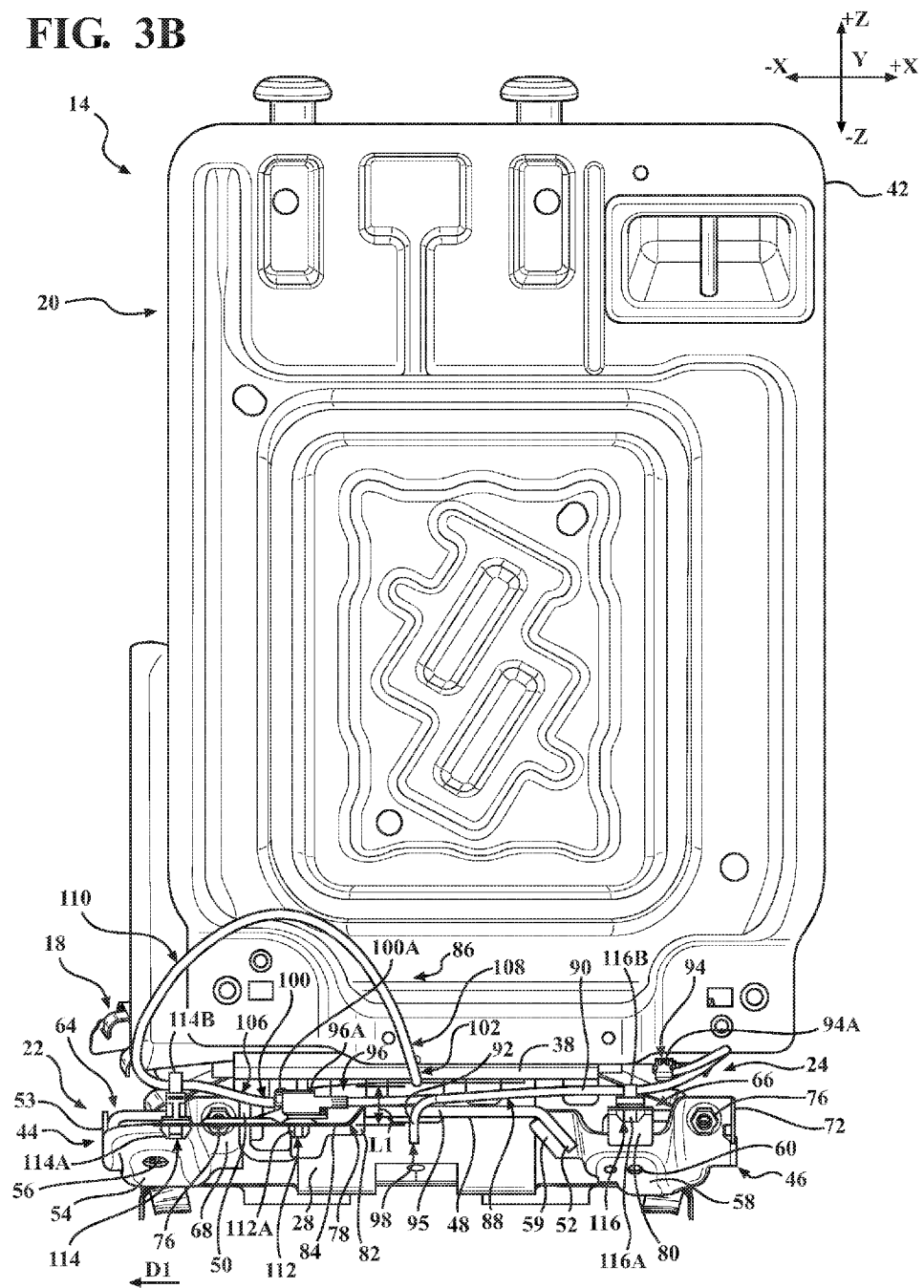
FIG. 3B schematically depicts a rear view of the seat assembly of FIG. 2 with the seatback in a seated position, according to one or more embodiments described and illustrated herein.
Figure 4A:
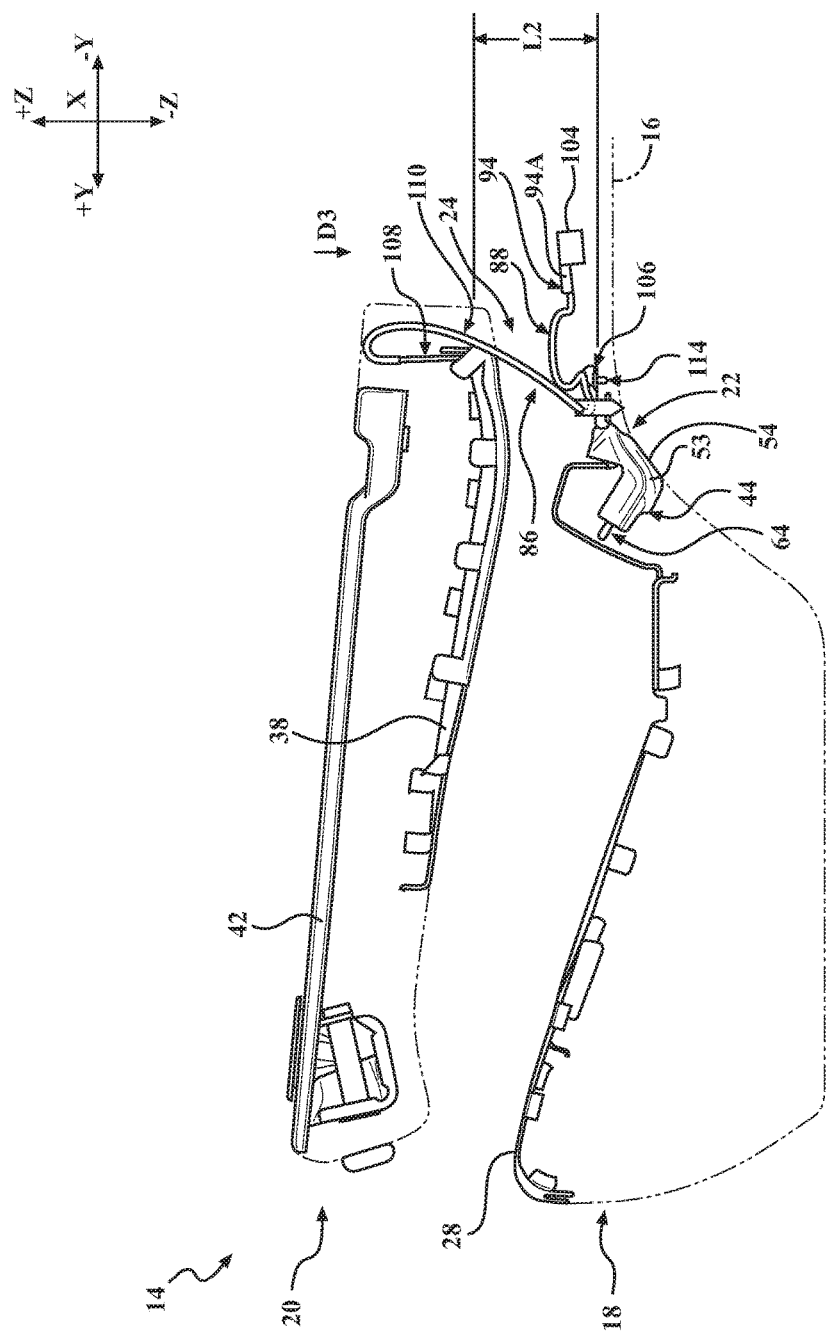
FIG. 4A schematically depicts a side view of the seat assembly of FIG. 2 with the seatback in a folded position, according to one or more embodiments described and illustrated herein.

The seatback 20 is pivotally mounted on the rear seat assembly 14. The seatback frame 36 may be pivotally mounted to the seat cushion arm 32 about pivot axis P. The seatback 20 is pivotally mounted to the seat cushion arm 32 for movement between a seated position, as shown in FIGS. 1 and 3A-3B, and a folded position, as shown in FIGS. 4A and 4B. In the seated position, the seatback 20 is provided to support the back portion of the occupant seated in the rear seat assembly 14. In the folded position, the seatback 20 is folded flat to permit access to a trunk or storage area. The seatback 20 is moved from the seated position to the folded position upon pivoting the seatback 20 about pivot axis P forward in the vehicle longitudinal direction. The seatback 20 is moved from the folded position to the seated position upon pivoting the seatback 20 about the pivot axis P rearward in the vehicle longitudinal direction.

Referring to FIG. 2, the child restraint bracket 22 includes a first mounting base 44, a second mounting base 46 and a traversing member 48. The traversing member 48 includes a first end 50 and an opposite second end 52. The first end 50 is connected to the first mounting base 44 and the second end 52 is connected to the second mounting base 46 such that the traversing member traverses between the first mounting base 44 and the second mounting base 46.

In some embodiments, the first end 50 and the second end 52 are welded to the first mounting base 44 and the second mounting base 46. In some other embodiments, the first mounting base 44, the second mounting base 46, and the traversing member 48 are integrally formed as a one piece monolithic structure.

The first mounting base 44 may include a first side wall 53, a first base portion 54, and a first front wall 55. The first side wall 53 at least partially bounds a portion of the first mounting base 44. The first base portion 54 may be a generally planar member having a first aperture 56. The first front wall 55 may extend forward in the vehicle longitudinal direction.

The second mounting base 46 includes a second front wall 57, a second base portion 58, and a protrusion 59. The second front wall 57 may extend forward in the vehicle longitudinal direction. The second base portion 58 may be a generally planar member having a second aperture 60. The protrusion 59 extends outwardly from the second mounting base 46 towards the first mounting base 44. The second end 52 of the traversing member 48 is connected to the protrusion 59 of the second mounting base 46. Fasteners 62 extend through the first aperture 56 and the second aperture 60 to secure the child restraint bracket 22 to the floor 16 of the vehicle 10. In some embodiments, the first base portion 54 and the second base portion 58 have a shape that corresponds to the shape of the floor 16 of the vehicle 10.

The first mounting base 44 includes a first isofix anchor 64. The second mounting base 46 includes a second isofix anchor 66. The first isofix anchor 64 and the second isofix anchor 66 of the child restraint bracket 22 provides rigid anchor points to connect the child safety seat and the floor 16 (i.e. vehicle body component) of the vehicle 10. The first isofix anchor 64 and the second isofix anchor 66 of the child restraint bracket 22 act as a rigid fixing assembly to secure child safety seats to seat assemblies under the ISOFIX system which is an international standard for attachment points for child safety seats in vehicles. The ISOFIX is optionally referred to as other regional names illustratively including LATCH ("Lower Anchors and Tethers for Children") in the United States and UAS ("Universal Anchorage System") in Canada.

The first isofix anchor 64 may be formed as a generally U-shaped member having an anchor bar 64A extending between a pair of arms 64B. The pair of arms 64B extend outwardly from the first mounting base 44 such that the anchor bar 64A is spaced apart from the first mounting base 44. The second isofix anchor 66 may be formed as a generally U-shaped member having an anchor bar 66A extending between a pair of arms 66B. The pair of arms 66B extend outwardly from the second mounting base 46 such that the anchor bar 66A is spaced apart from the second mounting base 46. The first isofix anchor 64 and the second isofix anchor 66 extend in a direction such that at least a portion of the first isofix anchor 64 and the second isofix anchor 66 extend between a junction of the seat cushion 18 and the seatback 20, as shown in FIG. 1.

In some embodiments, the pair of arms 64B of the first isofix anchor 64 are welded to the first front wall 55 of the first mounting base 44 and the pair of arms 66B of the second isofix anchor 66 are welded to the second front wall 57 of the second mounting base 46. In some other embodiments, the pair of arms 64B of the first isofix anchor 64 and the first mounting base 44 are integrally formed as a one piece monolithic structure and the pair of arms 66B of the second isofix anchor 66 and the second mounting base 46 are integrally formed as a one piece monolithic structure.

The first mounting base 44 may also include a first tab portion 68. The first tab portion 68 includes a first tab aperture. The first tab portion 68 may extend outwardly from the first base portion 54. The first end 50 of the traversing member 48 may be mounted to the first tab portion 68. The second mounting base 46 may also include a second tab portion 72 that extends from an opposite side of the protrusion 59. The second tab portion 72 includes a second tab aperture. The second tab portion 72 may extend outwardly from the second base portion 58. The second end 52 of the traversing member 48 may be mounted to the protrusion 59.

The child restraint bracket 22 may be mounted to the rear seat assembly 14 by fasteners 76 that extend through the first tab aperture and the second tab aperture. In some embodiments, the fasteners 76 mount the first tab portion 68 and the second tab portion 72 to a portion of the seatback frame 36 to connect the first mounting base 44 and the second mounting base 46 to the seatback frame 36 of the rear seat assembly 14. In some other embodiments, the fasteners 76 mount the first tab portion 68 and the second tab portion 72 to a portion of the seat cushion frame 26 to connect the first mounting base 44 and the second mounting base 46 to the seat cushion frame 26 of the rear seat assembly 14. It is appreciated, of course, that the child restraint bracket 22 may be mounted to the floor 16 of the vehicle 10, the rear seat assembly 14, or both the floor 16 of the vehicle 10 and the rear seat assembly 14.

The child restraint bracket 22 further includes a first flange 78 and a second flange 80. As will be described in greater detail below, the first flange 78 and the second flange are used to mount the seat heater wire harness 24 to the child restraint bracket 22. The first flange 78 may be mounted to the traversing member 48 between the first end 50 and the second end 52. In some other embodiments, the first flange 78 is mounted to the first mounting base 44. The second flange 80 may be mounted to the second mounting base 46. In some other embodiments, the second flange 80 may be mounted to the traversing member 48 between the first end 50 and the second end 52. The first flange 78 may be welded to the traversing member 48 or to first mounting base 44 and the second flange 80 may be welded to the second mounting base 46 or to the traversing member 48.

The first flange 78 may extend rearward in the vehicle longitudinal direction from the child restraint bracket 22. The first flange 78 may include a connection portion 82 and an extension portion 84. The connection portion 82 is connected to the traversing member 48. The extension portion 84 may extend outwardly in the vehicle lateral direction from the connection portion 82. The second flange 80 may extend rearward in the vehicle longitudinal direction from the child restraint bracket 22. In some embodiments, the second flange 80 extends farther rearward in the vehicle longitudinal direction than the first flange 78.

The seat heater wire harness 24 includes a seatback heater wire harness 86 and a main wire harness 88. The main wire harness 88 includes a main section 90 and an auxiliary section 92. The main section 90 includes a main end 94 and an opposite seatback connection end 96. The auxiliary section 92 includes a connection end 95 and a seat cushion end 98. The connection end 95 connects to the main section 90 between the main end 94 and the seatback connection end 96 such that the auxiliary section 92 branches off from the main section 90. The seatback heater wire harness 86 includes a first or main connection end 100 and an opposite second or seatback heater end 102.

The main end 94 may include a main terminal 94A that electrically connects the seat heater wire harness 24 to a vehicle power source 104. The vehicle power source 104 may be a battery, a secondary battery, and/or a motor generator. The seat cushion end 98 of the auxiliary section 92 of the main wire harness 88 may include a seat cushion terminal 98A. The seat cushion terminal 98A connects to the seat cushion heater 28. The seat cushion terminal 98A electrically connects the auxiliary section 92 of the main wire harness 88 to the seat cushion heater 28 such that the seat cushion heater 28 receives power from the vehicle power source 104.

The seatback connection end 96 may include a seatback connection terminal 96A. The main connection end 100 of the seatback heater wire harness 86 may include a main connection terminal 100A. The seatback connection terminal 96A connects to the main connection terminal 100A to electrically connect the main wire harness 88 to the seatback heater wire harness 86. The seatback heater end 102 may include a seatback heater terminal 102A. The seatback heater terminal 102A is connected to the seatback heater 38. The seatback heater terminal 102A electrically connects the main wire harness 88 and the seatback heater wire harness 86 of the seat heater wire harness 24 to the seatback heater 38 such that the seat cushion heater 28 receives power from the vehicle power source 104.

The seatback heater wire harness 86 includes a first portion 106, a second portion 108, and an intermediate portion 110. The first portion 106 is a portion of the seatback heater wire harness 86 adjacent the main connection end 100. The second portion 108 is a portion of the seatback heater wire harness 86 adjacent the seatback heater end 102. The intermediate portion 110 is the portion of the seatback heater wire harness 86 between the first portion 106 and the second portion 108.

The first flange 78 includes a first connector 112 that connects the main connection terminal 100A and the seatback connection terminal 96A to the first flange 78. In some embodiments, the first connector 112 connects the main connection terminal 100A to the first flange 78 and the connection between the main connection terminal 100A and the seatback connection terminal 96A connects the seatback connection terminal 96A to the first flange 78. In some other embodiments, the first connector 112 connects the seatback connection terminal 96A to the first flange 78, and the connection between the seatback connection terminal 96A and the main connection terminal 100A connects the main connection terminal 100A to the first flange 78.

The first flange 78 includes a supplemental connector 114 that connects the first portion 106 of the seatback heater wire harness 86 to the first flange 78. The supplemental connector 114 is spaced apart from the first connector 112 a predetermined distance such that a portion of the first portion 106 extends in a first direction D1 that is generally normal to the direction of movement of the seatback 20 about pivot axis P. In some embodiments, the first direction D1 may extend parallel with the vehicle lateral direction.

The second flange 80 includes a second connector 116 that connects a portion of the main wire harness 88 to the second flange 80. The second connector 116 may connect a portion of the main section 90 between the main end 94 and the auxiliary section 92. The second connector 116 connects the main wire harness 88 to the second mounting base 46.

The first connector 112, the supplemental connector 114, and the second connector 116 may be fasteners that secure the seat heater wire harness 24 to the child restraint bracket 22. In some embodiments, the first connector 112, the supplemental connector 114, and the second connector 116 are formed having clips 112A, 114A, 116A at one end and a wire harness attachments 112B, 114B, 116B at an opposite end. The clips 112A and 114A secure the first connector 112 and the supplemental connector 114 to the first flange 78. The clip 116A secures the second connector 116 to the second flange 80. The wire harness attachments 112B and 114B secure the first connector 112 and the supplemental connector 114 to the seatback heater wire harness 86. The wire harness attachment 116B secures the second connector 116 to the main wire harness 88.

In some embodiments, the clips 112A, 114A, 116A are snap fitted into apertures formed in the first flange 78 and the second flange 80. The wire harness attachments 112B, 114B, 116B may be formed as collars having openings through which portions of the seat heater wire harness 24 extend. The wire harness attachments 112B, 114B, 116B may be formed so as to prevent relative movement of the portions of the seat heater wire harness 24 with respect to the wire harness attachments 112, 114B, 116B.

Reference to FIGS. 3A and 3B, the orientation of the seat heater wire harness 24 when the seatback 20 is in the seated position will now be discussed in greater detail. As shown in FIG. 3B, the first portion 106 of the seatback heater wire harness 86 extends in the first direction D1 due to the orientation of the connection of the first connector 112 to the first flange 78. As shown in FIG. 3A, the second portion 108 of the seatback heater wire harness 86 extends in a second direction D2 that is different than the first direction D1. The first direction D1 may extend generally normal to the second direction D2. In some embodiments, the first direction D1 extends generally parallel with the vehicle lateral direction and the second direction D2 extends generally parallel with the vehicle longitudinal direction.

Reference to FIGS. 3A and 3B, as the second portion 108 extends in the second direction D2 that is different from the first direction D1 which the first portion 106 extends, the intermediate portion 110 is bent and/or curved to accommodate the change in directions. A portion of the intermediate portion 110 adjacent the first portion 106 may bend and/or curve from the first direction D1 so as to extend in a direction opposite the first direction D1. A portion of the intermediate portion 110 adjacent the second portion 108 may bend and/or or curve from the direction opposite the first direction D1 so as to extend into the second direction D3. In some embodiments, the intermediate portion 110 of the seatback heater wire harness 86 may have a generally C-shape when viewed in the second direction D2.

As shown in FIG. 3B, the first flange 78 is positioned a first distance L1 from the seatback heater end 102 in the vehicle vertical direction when the seatback 20 is in the seated position. The seatback heater wire harness 86 is configured to have an length between the main connection end 100 and the seatback heater end 102 that is greater than the first distance L1. As will be described below in greater detail, the bend and/or curve of the intermediate portion 110 provides the seat heater wire harness 24, specifically, the seatback heater wire harness 86 the sufficient length to accommodate the movement of the seatback 20 between the seated position and the folded position.

Reference to FIGS. 4A and 4B, the orientation of the seat heater wire harness 24 when the seatback 20 is in the folded position will now be discussed in greater detail. As shown in FIG. 4B, the first portion 106 of the seatback heater wire harness 86 remains extended in the first direction D1 due to the connection of the first connector 112 and the supplemental connector 114 to the first flange 78. As shown in FIG. 4A, the second portion 108 of the seatback heater wire harness 86 extends in a third direction D2 that is different than the first direction D1 and different than the second direction D2. The third direction D3 may extend generally normal to the first direction D1 and the second direction D2. In some embodiments, the first direction D1 extends generally parallel with the vehicle lateral direction, the second direction D2 extends generally parallel with the vehicle longitudinal direction, and the third direction D3 extends generally parallel with the vehicle vertical direction.

As shown in FIG. 4B, the first flange 78 is positioned a second distance L2 from the seatback heater end 102 in the vehicle vertical direction when the seatback 20 is in the folded position. The seatback heater wire harness 86 is configured to have a length between the main connection end 100 and the seatback heater end 102 that is greater than the second distance L2. The second distance L2 is greater than the first distance L1.

Reference to FIGS. 4A and 4B, the movement of the seatback 20 from the seated position to the folded position, straightens the intermediate portion 110 of the seatback heater wire harness 86. As the seatback heater wire harness 86 is provided to extend in the first direction D1 and the intermediate portion 110 bends and/or curves to extend in the second direction D2 when the seatback is in the seated position and in the third direction D3 when the seatback is in the folded position, the seat heater wire harness 24 accommodates the movement of the seatback 20 between the seated position and the folded position. The movement of the seatback 20 from the seated position to the folded position moves the seatback heater wire harness 86 from a retracted position, as shown in FIGS. 3A and 3B, to an extended position, as shown in FIGS. 4A and 4B. In the retracted position, the seatback heater wire harness 86, specifically the intermediate portion 110, is bent and/or curved to retain slack required to accommodate the increase in distance L1 to distance L2 upon movement of the seatback 20 from the seated position to the folded position. In the extended position, the seatback heater wire harness 86, specifically the intermediate portion 110, is straightened or extended to accommodate the increase in distance L1 to distance L2 when the seatback is in the folded position.

The connection of the first portion 106 to the first flange 78 by the supplemental connector 114 prevents stress from being applied to the connection of the seatback connection terminal 96A and the main connection terminal 100A. The connection of the main wire harness 88 to the second flange 80 by the second connector 116 secures the child restraint bracket 22. The securement of the main wire harness 88 to the second flange 80 prevents interference of the main wire harness 88 during movement of the seatback 20 between the seated position and the folded position.

The above described seat assemblies provide a seatback heater on a seatback that is moveable between a seated position and a folded position. As the wire harness includes a first end connected to a child restraint bracket and a second end connected to the seatback heater, the wire harness accommodates movement of the seatback between the seated position and the folded position.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A seat assembly for a vehicle having a floor, the seat assembly comprising:
    a seatback moveable between a seated position and a folded position;
    a seatback heater connected to the seatback;
    a child restraint bracket having a pair of isofix anchors; and
    a wire harness having a first end and an opposite second end, the first end is connected to the child restraint bracket, and the second end is connected to the seatback heater, the wire harness accommodates movement of the seatback between the seated position and the folded position.

2. The seat assembly of claim 1, wherein the wire harness includes a first portion adjacent the first end, a second portion adjacent the second end, and an intermediate portion between the first portion and the second portion,
    wherein the first portion extends in a first direction and the intermediate portion bends such that the second portion extends in a second direction different from the first direction.

3. The seat assembly of claim 2, wherein the child restraint bracket includes a first flange and a first connector that connects the first end to the first flange.

4. The seat assembly of claim 3, wherein the child restraint bracket includes a supplemental connector that connects the first portion to the first flange, the first connector is spaced apart from the supplemental connector in the first direction.

5. The seat assembly of claim 4 further comprising:
    a seat cushion;
    a seat cushion heater connected to the seat cushion; and
    a main wire harness having a main end, a seat cushion end, and a seatback end, the main end connects to a power supply, the seat cushion end connects to the seat cushion heater, and the seatback end connects to the first end and connects to the first flange by the first connector.

6. The seat assembly of claim 5, wherein the child restraint bracket includes a second flange and a second connector, wherein the second connector connects a portion of the main wire harness between the main end, the seatback end, and the seat cushion heater to the second flange.

7. The seat assembly of claim 6, wherein the child restraint bracket is connected to the floor of the vehicle.

8. A vehicle comprising:
    a floor;
    a seatback moveable between a seated position and a folded position;
    a seatback heater connected to the seatback;
    a child restraint bracket having a pair of isofix anchors; and
    a wire harness having a first end and an opposite second end, the first end is connected to the child restraint bracket, and the second end is connected to the seatback heater, the wire harness accommodates movement of the seatback between the seated position and the folded position.

9. The vehicle of claim 8, wherein the wire harness includes a first portion adjacent the first end, a second portion adjacent the second end, and an intermediate portion between the first portion and the second portion,
    wherein the first portion extends in a first direction and the intermediate portion bends such that the second portion extends in a second direction different from the first direction.

10. The vehicle of claim 9, wherein the child restraint bracket includes a first flange and a first connector that connects the first end to the first flange.

11. The vehicle of claim 10, wherein the child restraint bracket includes a supplemental connector that connects the first portion to the first flange, the first connector is spaced apart from the supplemental connector in the first direction.

12. The vehicle of claim 11 further comprising:
    a seat cushion;
    a seat cushion heater connected to the seat cushion; and
    a main wire harness having a main end, a seat cushion end, and a seatback end, the main end connects to a power supply, the seat cushion end connects to the seat cushion heater, and the seatback end connects to the first end and connects to the first flange by the first connector.

13. The vehicle of claim 12, wherein the child restraint bracket includes a second flange and a second connector, wherein the second connector connects a portion of the main wire harness between the main end, the seatback end, and the seat cushion heater to the second flange.

14. The vehicle of claim 13, wherein the child restraint bracket is connected to the floor of the vehicle.

15. A method of assembling a seat assembly of a vehicle having a floor, the method comprising:
    providing a seatback moveable between a seated position and a folded position;
    providing a seatback heater connected to the seatback;
    providing a child restraint bracket having a pair of isofix anchors, the child restraint bracket mounted to the floor of the vehicle; and
    connecting a first end of a wire harness to the child restraint bracket and connecting an opposite second end to the seatback heater such that the wire harness accommodates movement of the seatback between the seated position and the folded position.

16. The method of claim 15, wherein the wire harness includes a first portion adjacent the first end, a second portion adjacent the second end, and an intermediate portion between the first portion and the second portion,
    wherein the first portion extends in a first direction and the intermediate portion bends such that the second portion extends in a second direction different from the first direction.

17. The method of claim 16, wherein the child restraint bracket includes a first flange and a first connector that connects the first end to the first flange.

18. The method of claim 17, wherein the child restraint bracket includes a supplemental connector that connects the first portion to the first flange, the first connector is spaced apart from the supplemental connector in the first direction.

19. The method of claim 18 further comprising:
a seat cushion;
a seat cushion heater connected to the seat cushion; and
a main wire harness having a main end, a seat cushion end, and a seatback end, the main end connects to a power supply, the seat cushion end connects to the seat cushion heater, and the seatback end connects to the first end and connects to the first flange by the first connector.

20. The method of claim 19, wherein the child restraint bracket includes a second flange and a second connector, wherein the second connector connects a portion of the main wire harness between the main end, the seatback end, and the seat cushion heater to the second flange.

* * * * *